July 21, 1936.　　J. A. H. BARKEIJ　　2,048,051
INTERNAL COMBUSTION ENGINE
Filed March 3, 1930　　2 Sheets-Sheet 1
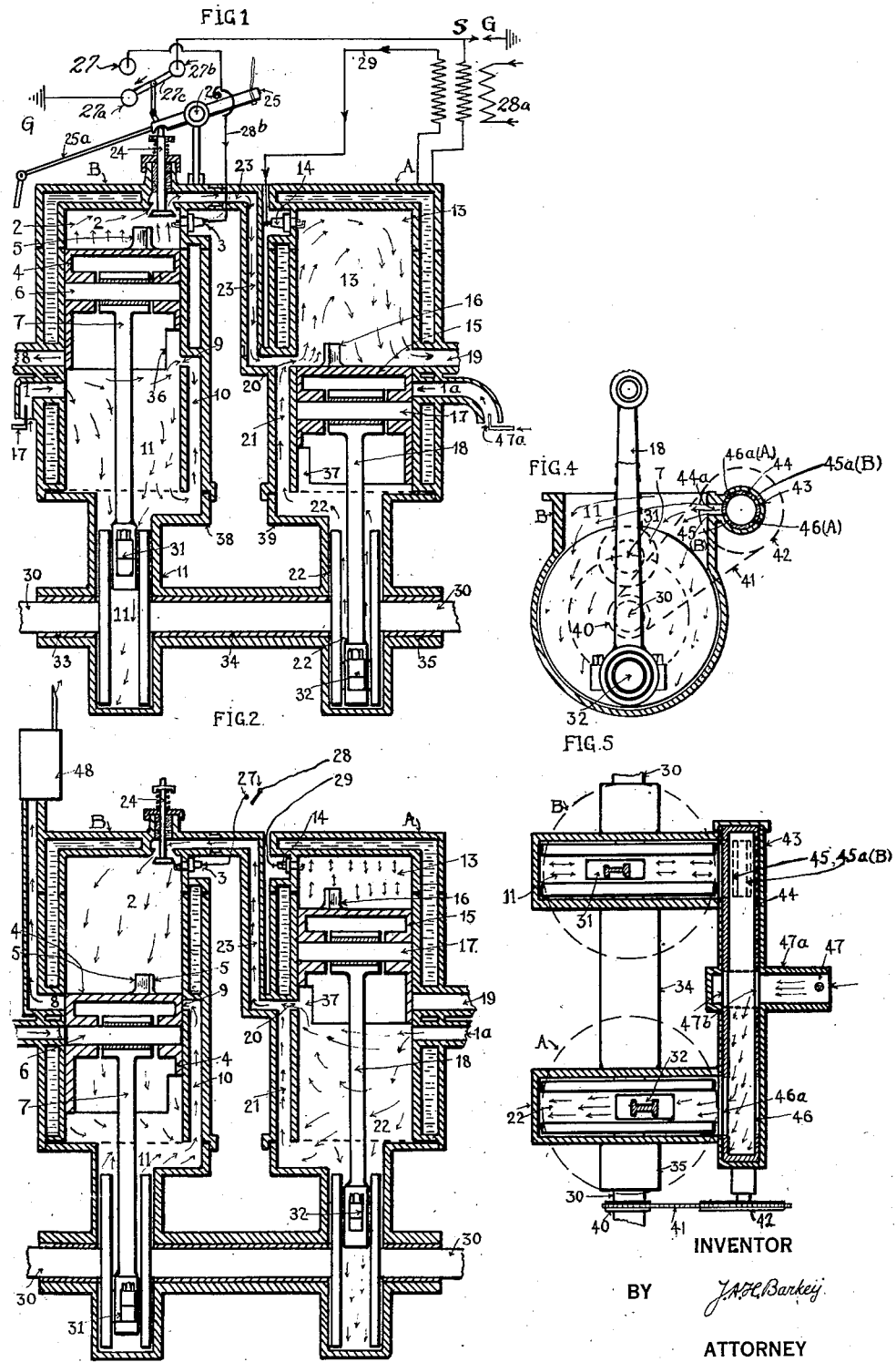
INVENTOR
BY J.A.H.Barkeij
ATTORNEY July 21, 1936.  J. A. H. BARKEIJ  2,048,051
INTERNAL COMBUSTION ENGINE
Filed March 3, 1930   2 Sheets-Sheet 2
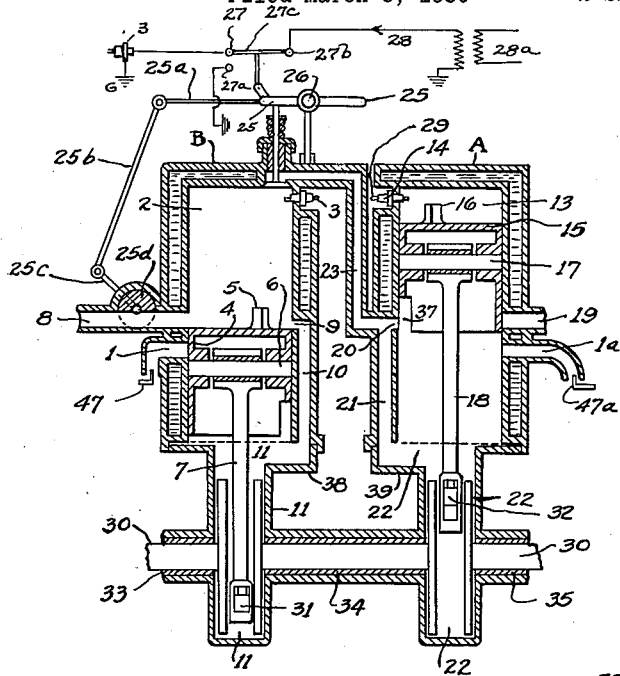
Fig. 3.
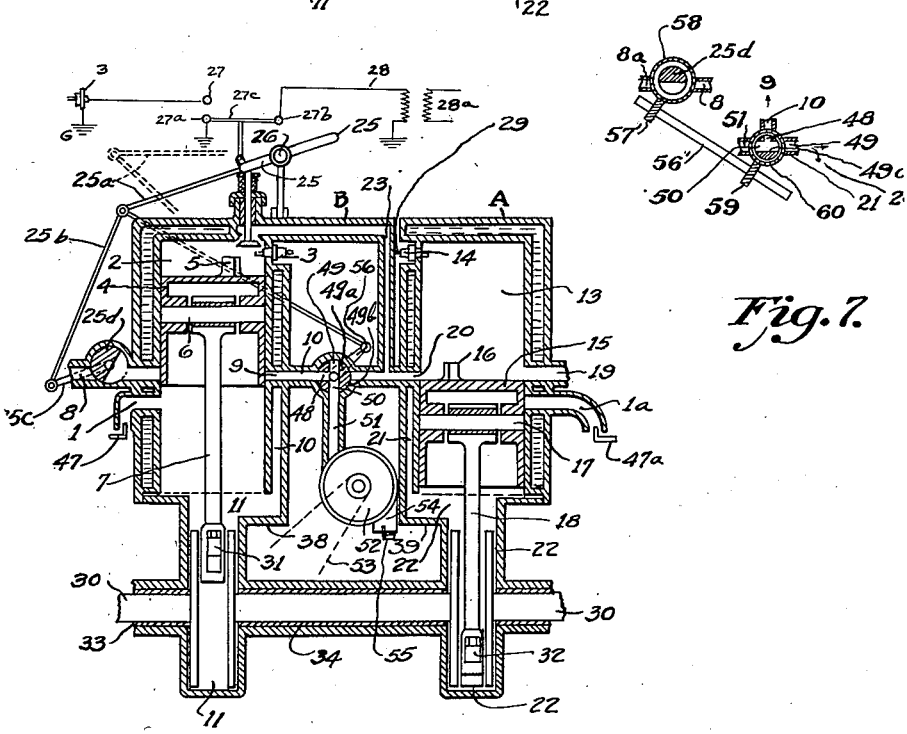
Fig. 6.
Fig. 7.
INVENTOR.
J.A.H. BARKEIJ.
BY
ATTORNEY.

Patented July 21, 1936

2,048,051

UNITED STATES PATENT OFFICE 2,048,051

INTERNAL COMBUSTION ENGINE

Jean A. H. Barkeij, Altadena, Calif.

Application March 3, 1930, Serial No. 432,915

20 Claims. (Cl. 123—59)

My invention improves more particularly the starting of two-cylinders, of two-stroke cycle internal combustion engines, using crankcase compression. In my Patent 1,722,951, means have been proposed to facilitate the starting of a two-cylinder, two-stroke cycle engine having simultaneous firing in both cylinders at 360° intervals. In this application, method and means are proposed to facilitate starting in a two-cylinder, two-strike cycle engine having alternative firing in the two cylinders at 180° intervals.

My first object is to increase the compression below the piston in the crankcase of one of the cylinders of a two-cylinder engine having parallel cylinders and pistons therein, moving up and down alternately, by the compression above the piston in the combustion-chamber of the other cylinder, by connecting said crankcase with said combustion-chamber temporarily during starting.

My second object is to interrupt the ignition in the combustion-chamber of said first cylinder, simultaneously with the connection mentioned in said first object, (see Fig. 1).

My third object is to combine the first and second objects with means to close the exhaust port of said second cylinder, temporarily (see Fig. 3).

My fourth object is to introduce into said two separate crankcases a mixture of gas and oil through a rotary valve, rotating synchronically with the engine speed, so that the crankcase of the first cylinder and the combustion space of the second cylinder, when in temporary connection therewith, are completely filled before said combustion space in said cylinder is brought in communication with the atmosphere via the exhaust port in said cylinder (see Figs. 4 and 5).

My fifth object is to locate the inlet port for the gas mixture in the crankcase of said first cylinder, which receives the increased compression in its crankcase, so that the crankcase of the first cylinder and explosion chamber of said second cylinder, temporarily connected therewith, receive a gas mixture before the exhaust port in said second cylinder is uncovered by the piston (see Fig. 2).

My sixth object is to locate the transfer port in said first cylinder so that the lower skirt of the piston near top position in said cylinder uncovers said transfer port before said piston opens with said lower skirt the inlet port to crankcase of said cylinder, so that the gas mixture may flow directly across this crankcase space in said transfer port and may enter the explosion space of said second cylinder before the exhaust port is opened by the piston.

My seventh object is to combined any of said aforementioned objects with each other, and with the following object.

My eighth object is to do away with crankcase compression entirely for regular operation and for starting purposes, by the use of a rotary compressor feeding both cylinders during normal operation, and only one cylinder during starting.

Fig. 1 is a vertical sectional view of a two cylinder, two stroke cycle engine constructed in accordance with my invention, Fig. 2 is a similar sectional view showing a different relative position of the pistons.

Fig. 3 is a fragmentary vertical sectional view showing the exhaust port and associated valve means for one of the engine cylinders, Fig. 4 is a detail sectional view of the crankcase showing a valve means for controlling the alternate introduction of a gas mixture into the crankcases, Fig. 5 is a horizontal sectional view of the crankcase structure as shown in Fig. 4, Fig. 6 shows a modified construction embodying a compressor, and—

Fig. 7 is a diagrammatic view of the operative connection between the valves associated respectively with the exhaust and the passages connecting said engine cylinders, Referring now to the drawings specifically, in Figs. 1 and 2 are shown two cylinders A and B and two crankcases 22 and 11, one for each cylinder. In cylinder B, 2 is the explosion space, 3 the sparkplug, 4 the piston, 5 the deflector on the piston, 6 the piston pin, 7 the connecting rod, 11 the crankcase space, 1 the inlet port for said crankcase. The equivalent parts in cylinder B are numbered 13 to 18 and the inlet port for the crankcase is numbered 1a. 23 is the communication passage between the top end of cylinder B and the transfer-passage 21 of cylinder A. This communication, however, is controlled by a poppet valve 24, provided with a spring which keeps it closed. This valve can be opened by a lever 25 on a fulcrum 26. The lever interrupts at the same time, or rather previously, the high-tension current in the wire 28, leading to the sparkplug 3. It can, of course, also interrupt the primary current of the ignition system. In Figs. 1 and 3 the primary and secondary circuits are shown roughly in a diagram. The switch 27c is shown in such a position in Fig. 1 that the secondary current is passed immediately to the ground and not to the sparkplug 3, the valve 24 being opened by the same lever a little later. In Fig. 3 the switch 27c is shown leading the secondary current to sparkplug 3, while the valve 24 is closed. In both diagrams the primary circuit is 28a, and the secondary circuit 28 for sparkplug 3.

In Fig. 3, the lever 25 lifting the valve 24 for starting purposes and cutting off the current for cylinder B, operates simultaneously therewith a throttle in the exhaust passage 8 of the cylinder B, by means of the levers 25a, 25b, 25c, and the rotary valve 25d, for purposes which will be described later. In Fig. 3 the valve 24 is shown in closed position, the valve 25d in open position, and the switch 27c leading the secondary current to the sparkplug 3. When the lever 25, 26 is depressed, the switch 27c leads the secondary current to the ground, opens next the valve 24, as shown in Fig. 1, and closes the valve 25d in the exhaust pipe of cylinder B.

In Fig. 4, the crankcase 11 is shown in vertical section, provided with a hollow rotary valve 44, rotating synchronically with half the engine speed. Said valve is rotated preferably at half-engine speed to decrease the circumferential speed, and said hollow valve is therefore provided with two ports diametrically opposite each other, respectively, 45 and 45a, for crankcase 11 of cylinder B. The valve is equally provided with two inlet ports, 46 and 46a, for the crankcase 22 of cylinder A. This valve rotates in a casing 43, and connects with the crankcase via an inlet port, 44a. The valve is driven from the crankshaft 30 by means of a pulley 40 on the shaft 30, a chain 41 and a pulley 42 on the rotary valve 44.

In Fig. 5, the same rotary valve and both crankcases 11 and 22 are shown in horizontal section, showing the same parts of Fig. 4 and in addition thereto, the position of the fuel-mixing means between the two ends of this valve. The rotary valve is provided in the middle with a series of ports 47b, so that the inside of the valve is in constant communication with the inlet passage 47a, in which is located the jet 47. The fuel-mixing means may however be placed at one end of the casing 43. The connecting rod 31 of cylinder B is shown a little ways down from its top position, the connecting rod 32 of cylinder A is shown a little ways up from its down position and the port 46a in the valve 44 begins to admit gas to the crankcase 22. The crankcase 11 is shown in the condition of compressing the previously admitted gas, which is to be admitted to explosion space 2 of cylinder B for regular firing, or towards the cylinder space 13 of cylinder A for starting purposes.

The operation of the engine is as follows, when started, by manual force or by an electric starter.

Supposing the engine being in the position of Fig. 2, the gas enters through the inlet port 1a of cylinder A in the crankcase 22 before the piston 4, in the cylinder B, uncovers the exhaust port 8 to the atmosphere via a separate (preferably) muffler 48 for cylinder B, and enters therefore also, earlier the transfer passage 23, via the recess 37 in the skirt of piston 15, and enters via the depressed valve 24 into the combustion space 2 of cylinder B, on account of the partial vacuum in both chambers, before the piston 4 uncovers the exhaust passage 8, and the transfer passage 9 a little bit later. The engine rotating a little further about 3°, piston 4 in cylinder B uncovers port 8, and if the gas from 1a has not yet sufficiently filled the explosion space 2, a little bit of air may enter this chamber via the muffler 48 from the atmosphere as no explosion has taken place in cylinder B from the moment the motor is started, cylinder B having a muffler separate from cylinder A, as shown in Fig. 2. Shortly thereafter, about 10°, however, the gas under compression in the crankcase 11 of cylinder B will rush via the transfer passage 10 and transfer port 9 into the combustion space 2 of cylinder B and will drive out into the exhaust port 8 any air that might have entered said cylinder B via said exhaust port, and part of this gas might go further via the valve 24 and passage 23 into the crankcase 22 of cylinder A, being nearly completely filled through 1a. The engine rotates further, about another 30°, passing with pistons 4 and 15 their respective bottom and top positions, (i. e. a little further than the position shown in Fig. 2, in which the piston 4 is going downwards to reach bottom position, and piston 15 going upwards to reach top position), piston 4 going upwards covers up both ports 9 and 8 in cylinder B, and piston 15 going further downwards in cylinder A begins to cover up with its lower skirt inlet port 1a and inlet passage 20 in cylinder A. About 180° later, we have the position of the various parts, as shown in Fig. 1. The gas in cylinder B is being compressed above the piston 4 and driven via valve 24 towards the crankcase 22 of cylinder A. When piston 4 in cylinder B is nearing its maximum-compression position, the piston 15 in cylinder A uncovers the exhaust port 19 and a little later uncovers the inlet port 20, and the compressed gases from the combustion space 2 of cylinder B and from the crankcase 22 of cylinder A dart into the cylinder space 13 of cylinder A, driving out completely by its overpressure the old gases (air, or burned gas from a previous explosion) left therein. The engine rotating 180° further, compresses the gases above piston 15 in cylinder A, a spark passes the points of sparkplug 14 and ignites the gas. This cycle may repeat itself until the valve 24 is closed and brought into its normal position, closing the explosion space 2 of cylinder B for normal firing therein and closing also the circuit for the ignition of the sparkplug 3 of cylinder B. Thereafter, both cylinders receive their regular charges from their respective crankcases in orthodox manner.

To prevent any loss of compression, due to said explained relatively low position of port 1a in cylinder A, another feature may be added to the construction of Figs. 1 and 2, which will allow a position of the port 1a, (and also inlet port 1 similarly constructed for the sake of equal operation of both cylinders during normal operation), which is most favorable to maximum compression for this orthodox method of admitting charges to the respective crankcases 11 and 22, below the skirt of the respective pistons in said cylinders. Fig. 3 shows a throttle, by preference a rotary valve 25d, in the exhaust port 8 of cylinder B, which port may be closed simultaneously with the opening of valve 24, as shown in Fig. 3 by the dotted line on valve 25d in view of the positions of the lever 26 and switch 27c in Fig. 1. In this construction, the volume of gas admitted through inlet port 1a of cylinder A, will be increased by the compressed gases from crankcase 11, when the piston 4 uncovers the port 9 in cylinder B. No air or gas can enter in explosion space 2 from exhaust port 8. The pressure from crankcase 11 may blow back some gas, via valve 24, passage 23, transfer port 20, through the inlet port 1a, which is still open as long as port 9 in cylinder B is uncovered by the top of the piston 4. This closing of the exhaust port 8 will be, therefore, also of greater advantage in case a rotary valve 44 for the admission of gas to the crankcase 22 of cylinder A is applied, as shown in Figs. 4 and 5, said rotary valve may be constructed so that it closes a little before said port 9 is uncovered by the piston 4, so that the over-pressure from crankcase 11 can not escape via explosion space 2, valve 24, passage 23, inlet port 20 via crankcase 22 through the rotary valve 44 (see Fig. 4). It is clear, that, if the admission port 1a is used, the piston 15 can not close conveniently the port 1a before the port 9 in cylinder A is uncovered.

With the application of a rotary valve, driven synchronically with the engine speed, this can be easily effected, and the port 45 (or 45a) in rotary valve 44 (see Fig. 4) can also admit gas, as soon as the pistons 4 and 15 begin their upward motion, so that almost the complete upward stroke of the pistons can be used to draw in a charge into the respective crankcases.

Figs. 4 and 5 show said other construction to avoid a loss of compression in the crankcase as explained, resulting further in higher speeds during normal operation. In Figs. 1 and 2, it is shown that cylinders B and A receive their gas via the inlet ports 1 and 1a in the cylinders, when the respective pistons 4 and 15 uncover these ports near their top position. Fuel-mixing means 47 and 47a are shown in Fig. 1 separately for the two cylinders B and A; but it is supposed, of course, that both cylinders may receive their gas from a common carburetor. As we have already seen, this uncovering of ports 1 and 1a should take place rather early, by preference before exhaust port 8 in cylinder B is uncovered by the top of the piston 4 in cylinder B. This early uncovering has the disadvantage that a part of the gas is rejected into the inlet manifold by the piston going down during normal operation and a certain loss of compression is the result. Therefore, it is preferred to admit the gas to the cylinders not via these inlet ports 1 and 1a, but via a rotary valve 44, as shown in Figs. 4 and 5, admitting during the entire upward movement of piston 15 in cylinder A gas to the crankcase 22, and therefore, also, to the explosion space 2 of cylinder B via valve 24 during starting, when the piston 4 goes down. When the piston 4 in cylinder B uncovers the exhaust port 8, the crankcase 22 in cylinder A and cylinder space 2 in cylinder B will be already completely filled with gas, so that the amount of inert gas which might enter the cylinder space 2 from exhaust port 8 will be negligible, especially as the compressed gas from crankcase 11 after port 9 is uncovered, will add some more fresh gas to this space. During normal operation, both crankcases 11 and 22 will have the advantage of full charges even at very high speeds and also during starting periods. It is, of course, possible to combine the construction of Figs. 4 and 5 with that of Fig. 3, so that explosion space 13 of cylinder B will receive a super-charge from crankcase 22, explosion space 2 and crankcase 11, as the exhaust port 8 is closed in cylinder B by the valve 25d, and the inlet port 44a, 46 of the rotary valve 44 of cylinder A is also closed, as explained. (See Fig. 4.)

It is understood that the cylinders A and B shown in Figs. 1 and 2 may be arranged opposite to each other, or at an angle, provided the respective pistons therein reach their top and bottom position respectively alternately.

In actual construction, the cylinders A and B should be placed so that the sparkplugs are at the same side of the cylinders and also the exhaust and inlet ports on the other side. The cylinders are shown in Figs. 1 and 2 like the two pages of a book for the sake of clearness, so that when cylinders A and B are rotated 90° towards each other, the aforesaid position is obtained. The crankshaft and crankcase remain in position as shown, but the deflectors 5 and 16 on the respective pistons 4 and 15 change their position accordingly, at 90°. The transfer passage 23 should be further as short and small as possible to avoid too great an increase of the compression space 22 of cylinder A, for normal operation. Both chambers 11 and 22 should be approximately of the same volume for normal operation. The stem of valve 24 should slide in a packing gland to keep compression in case 22.

Referring now specifically to Fig. 6, a part of Figs. 1, 2, 3 is shown there, as much as is necessary for the understanding of the construction of said figure, and the engine operation connected therewith. The cylinders, pistons, interruption of ignition of cylinder B, closing of the exhaust port 8 of cylinder B, opening of the valve 24 in cylinder B (see Figs. 1 and 3) are all the same here, the crankcase compression is only supplemented by the pressure of the rotary compressor 52 shown in Fig. 6. Almost the same method, as shown in Figs. 1, 2, 3 and explained before, is used here, only with this difference that only the chamber 2 of cylinder B is used to feed a gas under pressure to cylinder A without making use of the crankcase of either cylinder, as in the previous method. The compressor is connected to the respective inlet openings 9 and 20 (previously called more appropriately transfer ports 9 and 20) of cylinders B and A via a rotary valve 49a, having a threeway passage therein, respectively 48, 49, 50. In the position of the valve shown, the passages 48 and 50 connect the left cylinder B with the rotary compressor 52, driven by a chain 53 from the crankshaft 30, and having fuel mixing means 55 in the inlet passage 54 thereof.

*The operation is as follows.*—Supposing that the respective pistons 4 and 15 are in the position of Fig. 6, (which position is equivalent to that of the pistons shown in Fig. 1) it is seen that the lower skirt of the piston 4 in cylinder B does not uncover the inlet port 9, as the crankcase compression is done away with during normal operation, as well as during starting conditions. The right cylinder A does not receive any gas from the compressor through inlet port 20, uncovered by piston 15 at its top end, as the compressor does not develop enough pressure when the engine speed is low and is therefore shut off by valve 49a. 180° later, the pistons are a little further than the position shown in Fig. 2, and inlet port 9 receives via said rotary valve, passages 50 and 48 gas from the compressor, as the piston 4 created a partial vacuum in cylinder B, the exhause port 8 being closed, as shown in Fig. 3, together with the opening of the valve 24 and the breaking of the circuit of spark plug 3; and the port 20 of cylinder A is also closed by the lower skirt of piston 15, as explained already for the other cylinder. The piston 4 now going up closes port 9, compresses the gas in chamber 2 and passage 23, and transfers this gas via inlet opening 20 in cylinder A, when the piston 15 uncovers this port with its top end. The volume of the explosion space plus the volume of the transfer passage 23 should be so that the pressure is not too high, so that the cylinder A receives enough gas to speed up the engine so much that the compressor develops enough pressure to feed gas directly to both cylinders alternatively. The rotary valve 49a, is of course, connected to lever 25 by a link 57 in the same way, as is shown for rotary valve 25d in Fig. 3, so that said lever 25 operates four things at the same time, first breaking the circuit of the sparkplug 3 of cylinder B, 2° opening the valve 24 in passage 23 connecting the combustion space of cylinder B with that of cylinder A, 3° closing with valve 25d the exhaust port 8 of cylinder B, and 4° closing also with valve 49a the connection between compressor 52 and cylinder A. When the engine has gained enough speed, the lever brings these parts in the normal condition for normal operation, the circuit of the sparkplug 3 is reestablished, the valve 24 closes the passage 23, the rotary valve 25d opens the exhaust port, and the rotary valve 49a connects both cylinders with the compressor, so that passage 50 connects up with port 20 of cylinder A, and passage 49 with port 9 of cylinder B.

The valve 25d is actuated in synchronism with valve 49a by means of gearing. Valves 25d and 49a are actuated by gears 57' and 59 respectively, which gears are in turn drivingly connected by shaft 56'.

However, if said compressor is of such a type that it can hold pressure, if not create it, the rotary valve 49a may be done away with and ports 9 and 20 connected permanently with the compressor, through the three-way passage 48, 49, 50 as shown in the casing 49b without the valve. The exhaust port 8 of cylinder B is then closed as before, and the valve 24 opened and the circuit of ignition of sparkplug 3 broken. The operation is practically the same as explained before, only with this difference, that when the piston 4 goes up and presses the gas via 24 and 23 to cylinder A, that the compressor 52 has to hold this pressure so that cylinder A receives a sufficient charge from combustion space 2 to speed up the engine enough for normal feeding of the gas by the compressor directly to both cylinders. If this is the case, the lever 25 closes the valve 24, opens the exhaust port 8 of cylinder B, and reestablishes the circuit of plug 3 for normal operation.

Under certain conditions in the last two arrangements, it is not always necessary to close the exhaust port 8 of cylinder B. The piston 4 may uncover port 8 a little before the port 9 is uncovered. The cylinder space 2 is not yet filled with inert gas by the time port 9 is uncovered and the blower, delivering what pressure it has, will be able to introduce enough gas in said cylinder to effect an explosion in cylinder A. After one or several explosions burned gas will be admitted through port 8 to cylinder 2 instead of air before any explosion in said cylinder occurred, as the muffler, if there is only one for both the cylinders, will by now be filled completely with burned gas from cylinder A. If however the cylinder B has a separate muffler 48, as shown in Fig. 2, the exhaust port 8 will only admit air to cylinder 2 and the blower can be adjusted so (or the blower plus fuel mixing means) that a rich mixture is admitted through port 9 in addition to the air admitted through 8. The lifting of the valve 24 and breaking of the circuit 28 is, of course, the same as in the previous starting method. This last method has the advantage of greater simplicity, especially if valve 49a is omitted, as explained, so that the lever 25 has to operate only on the valve 24 and on the electrical circuit 28.

It is, of course, understood that if said engine is operated on the Diesel cycle with fuel injection, with or without air, that the fuel injector in cylinder B has to cease operation in order to transfer the aircharge from cylinder B to cylinder A. The fuel has to be led back to the reservoir in ways well known in the art.

It is also understood that if the engine has more than two cylinders, or a multiple of two cylinders, compressing charges in pairs alternately with 180° intervals, that the aforegoing method may be only applied on one pair of cylinders, while relieving the compression of the other cylinders via a compression relief valve 24 in the atmosphere instead of leading it to the other cylinder of each pair, to decrease resistance during starting. It may be however applied on each pair of cylinders compressing charges in pairs alternately with 180° intervals, according to the human or mechanical power available to start the engine.

I claim:

1. In a two-cylinder, two-stroke cycle engine, the combination of two separate crankcases for said respective cylinders, a piston in each cylinder, one piston going up in one cylinder when the other goes down in the other cylinder, a communication passage between the combustion chamber of the first of said cylinders at the top end thereof and the crankcase of the other cylinder, valvular means in said passage to establish and interrupt said communication, controlled inlet and exhaust ports in each of said cylinders and ignition means in each of said cylinders.

2. The combination of claim 1, in which said pistons control the exhaust and transfer port near the lower end of said cylinders by the top end of said pistons and the inlet port to the crankcases of said cylinders by the lower end of said pistons.

3. The combination of claim 1, in which said valvular means are combined and operated simultaneously with means to interrupt ignition in said first cylinder before said communication is established.

4. The combination of claim 1 combined and operated simultaneously with valvular means located in the exhaust port of said first cylinder to close said port.

5. The combination of claim 1, combined with valvular means to admit a gas to said crankcases during approximately 180° of engine revolution, said second means stopping admission of gas to said crankcase of said second cylinder before the transfer port, between said first cylinder and the crankcase of said first cylinder, is uncovered.

6. The combination of claim 1, combined with valvular means to admit a gas to said crankcase during approximately 180° of engine revolution, said valvular means stopping admission of gas to said crankcase of said second cylinder before the transfer port, between said first cylinder and the crankcase of said first cylinder is uncovered, said transfer port in said first cylinder being uncovered by the top end of the piston in said first cylinder, when near its bottom position.

7. In a two-cylinder, two-stroke cycle engine, the combination of two cylinders, and two separate crankcases, a reciprocating piston in each of said cylinders, means to use the chamber above the piston in one cylinder together with the chamber below the piston in the other cylinder as a compression-chamber, in order to transfer a gas mixture from said two spaces to the explosion chamber above the piston in said last cylinder during starting conditions, and ignition means in said last cylinder.

8. In a two-cylinder, two-stroke cycle engine, the combination of two cylinders, reciprocating pistons in each of said cylinders, alternate firing means in said cylinders during normal operation at 180° intervals, and means firing only in one of said cylinders during starting conditions at 360° intervals, means to connect the explosion chamber above the piston in one cylinder with the crankcase-chamber below the piston in the other cylinder, as a compression-chamber to transfer a gas mixture from said chambers to the explosion-chamber above the piston in said last cylinder.

9. In an internal combustion engine of the two-stroke-cycle type, having at least two cylinders, a reciprocating piston in each of said cylinders, said pistons going up and down alternatively in said respective cylinders, alternate firing means in said cylinders during normal operation at 180° intervals, and means firing only in one of said cylinders during starting or limited power output conditions at 360° intervals, means including a passage with a valve therein to use the combustion chamber above the piston in the first cylinder to transfer a charge of gas above the piston in the other cylinder, means to interrupt the ignition in said first cylinder, valvular means to close the exhaust port of said first cylinder, said means being operated simultaneously.

10. The combination of claim 9, combined with valvular means to feed gas to both of said cylinders directly with a rotary compressor, when said means reestablish the ignition in said first cylinder.

11. The combination of claim 9, in which said pistons control with their top ends the exhaust and inlet port in the lower end of said cylinders, valvular means in combination with a rotary compressor to feed gas to said first cylinder under starting conditions through the respective inlet port of said cylinder, and valvular means to feed gas to both cylinders through said respective inlet ports during normal operation.

12. The combination of claim 9, in which said pistons control with their top ends the exhaust and inlet ports in the lower end of said cylinders, valvular means to feed said first cylinder gas under starting conditions through said respective inlet port, said same means feeding gas through the respective inlet ports of both of said cylinders during normal operation.

13. The method of starting a gas engine of the two-stroke-cycle type, having pairs of cylinders, reciprocating pistons in said cylinders of which one is substantially in top position when the other piston is substantially in bottom position, which consists in substantially relieving the compression in one cylinder of a pair and eliminating the ignition therein, while charging another cylinder from said first cylinder, said first cylinder receiving a charge before transferring said charge to the other cylinder of a pair.

14. In a device of the class described, a multicylinder engine having a pair of communicating cylinders, pistons operating in said cylinders and timed to alternately compress the charge of fluid in said communicating cylinders, ignition devices for said cylinders, a compression relief valve for one of the cylinders, and means operable to cut-out the ignition device of the cylinder having said relief valve during the starting period of said engine.

15. In an engine of the two-stroke-cycle type having a pair of communicating cylinders, pistons operating in said cylinders and timed to alternately compress the charge of fluid in said communicating cylinders, ignition devices for said cylinders, a compression relief valve for one of said cylinders and means operable to cut-out the ignition device of the cylinder having said relief valve during a portion of said engine operation.

16. In an engine of the two-stroke-cycle type having a pair of communicating cylinders, pistons operating in said cylinders and timed to alternately compress the charge of fluid in said communicating cylinders, ignition devices for said cylinders, a compression relief valve for one of said cylinders, means utilizing the compressed fluid exhaused through said relief valve for starting the engine, valve means for said other cylinder for controlling the admission of a working charge, and means operable to cut-out the ignition device of said former cylinder during a portion only of said engine operation.

17. In an internal combusion engine including a pair of cooperating combustion chambers, said engine provided with a passage connecting the aforesaid combustion chambers, ignition means in each of said chambers, a relief valve means associated with one of said chambers and operable to control the communication between said chambers by said passage, and means operable to cut out the ignition means in said chamber associated with said relief valve means, said relief valve being then opened to permit the transfer of the combustible charge from the aforesaid chamber to said other chamber during the engine starting period, said ignition means in said latter chamber operating during the engine starting period.

18. In an internal combustion engine including a pair of communicating combustion chambers, one of said chambers having inlet and exhaust means, ignition means for each combustion chamber, a valve intermediate said chambers and serving exclusively to transfer the combustible charge from one chamber to the other, and means operable to cut out the ignition means in said first chamber during the starting period of said engine and while the charge is being transferred into said second chamber in which the associated ignition means is operable.

19. In an internal combustion engine including a pair of cooperating combustion chambers, one of said chambers having inlet and exhaust means, ignition means for each of said chambers, means for introducing a combustible charge to one of said chambers only, means operable to transfer said combustible charge to said other chamber, and means operable to cut out the ignition means only in said first chamber during the starting period of said engine and while the combustible charge is being transferred into said second chamber having ignition means which are operable.

20. In an internal combustion engine including a pair of cooperating communicating combustion chambers, ignition means for each combustion chamber, a valve intermediate said chambers and serving to exclusively control the communication between said chambers, means for rendering the ignition means inoperative in one of said chambers, means introducing a combustible charge to said chamber in which said ignition means is inoperative and while said valve is closed whereby said other chamber is without a combustible charge, and means operating said valve in timed relation with engine operation to transfer said combustible charge from said first chamber to said other chamber.

J. A. H. BARKEIJ.